United States Patent
Morita et al.

(10) Patent No.: US 7,752,985 B2
(45) Date of Patent: Jul. 13, 2010

(54) METHOD FOR ATTACHING SURFACE SKIN MEMBER WITH STITCH LINE

(75) Inventors: Masamichi Morita, Kanagawa (JP); Akira Kanezawa, Ota (JP)

(73) Assignees: Kasal Kogyo Co., Ltd., Mlyayama, Samukawa-cho, Kouza-gun, Kanagawa (JP); Isuzutex Co., Ltd., Serada-cho, Ota-shi, Gunma (JP)

( * ) Notice: Subject to any disclaimer, the term of this patent is extended or adjusted under 35 U.S.C. 154(b) by 374 days.

(21) Appl. No.: 11/772,514

(22) Filed: Jul. 2, 2007

(65) Prior Publication Data

US 2008/0006194 A1    Jan. 10, 2008

(30) Foreign Application Priority Data

Jul. 7, 2006    (JP)    .............................. 2006-188390

(51) Int. Cl.
   *D05B 15/00*    (2006.01)
   *D05B 35/06*    (2006.01)
(52) U.S. Cl. .............................. 112/475.04; 112/475.08; 112/470.27
(58) Field of Classification Search ............ 112/470.27, 112/475.08; 29/91, 91.1; 297/218.1–218.5; 428/43
   See application file for complete search history.

(56) References Cited

U.S. PATENT DOCUMENTS

| 3,671,984 | A | * | 6/1972 | Ambrose | ........................ 5/402 |
| 4,765,045 | A | * | 8/1988 | Selbert et al. | ................ 29/91.1 |
| 4,885,828 | A | * | 12/1989 | Kozlowski | ................... 29/91.5 |
| 5,560,677 | A | * | 10/1996 | Cykana et al. | ............ 297/218.3 |
| 5,635,264 | A | * | 6/1997 | Pike et al. | ....................... 428/43 |
| 6,059,918 | A | * | 5/2000 | Mingeishi et al. | ............ 156/293 |
| 7,134,730 | B2 | * | 11/2006 | Flegal et al. | ............. 297/452.6 |

FOREIGN PATENT DOCUMENTS

| DE | 202004003134 U1 | 6/2004 |
| JP | 08276794 A | 10/1996 |
| JP | 2003246243 A | 9/2003 |

OTHER PUBLICATIONS

English Language Abstract for JP8276794.
English Language Abstract for JP2003246243.
English Language Abstract for DE202004003134.

* cited by examiner

*Primary Examiner*—Ismael Izaguirre
(74) *Attorney, Agent, or Firm*—Norris, McLaughlin & Marcus

(57) ABSTRACT

In a method for attaching s surface skin member with a stitch line onto a base core member, meandering of a stitch line is eliminated and thus a smart stitch line is formed. A stitch line A is formed on a surface skin member 33 of which material is artificial leather or genuine leather, a rod 36 is temporarily joined along the stitch line A on a reverse side of the surface skin member 33, a groove 311 is provided along the stitch line A on a surface of a base core member 31, the surface skin member 33 is attached and fixed on the surface of the base core member 31 while accurately positioning the stitch line A by accommodating the rod 36 inside the groove 311, and then the rod 36 is drawn out so as to accurately form the stitch line A.

2 Claims, 8 Drawing Sheets

PRIOR ART

PRIOR ART

METHOD FOR ATTACHING SURFACE SKIN MEMBER WITH STITCH LINE

BACKGROUND OF THE INVENTION

1. Field of the Invention

The present invention relates to an interior component for a vehicle having good appearance and design, such as an armrest and ornament lids of boxes, and in particular, to a method for attaching a surface skin member of the interior component for a vehicle using the surface skin member with a stitch line in order for accurately positioning the stitch line and allowing the surface skin member to be efficiently attached.

2. Description of the Related Art

FIG. 13 shows a door trim 1 mounted on an interior face side of an automotive door panel. The door trim 1 is assembled by mounting various functional components such as an armrest 3, an inside handle unit 4 and a speaker grille 5 in predetermined positions on a surface of a door trim body 2 formed in a desired curved contour. For more details, as shown in FIG. 14, the door trim body 2 has mounting rigidity for the door panel (not shown), and is constituted by attaching a surface skin member 2b on the surface of a resin core member 2a having a shape retaining property. Conventionally, the armrest 3 mounted on the door trim body 2 generally uses a three-layer laminated assembly wherein an armrest pad 3b is laminated on the surface of an armrest core member 3a and an outer surface thereof is further covered by an armrest surface skin member 3c.

A sewing product of artificial leather or genuine leather is often used as the armrest surface skin member 3c for a high-grade product of the armrest 3. As shown in FIGS. 15 and 16, an armrest 3A of a high-grade specification using the artificial leather or genuine leather is constituted by laminating the armrest pad 3b such as an urethane pad on the surface of the armrest core member 3a formed in a required shape by injection molding and covering the surface thereof with the armrest skin 3c made by performing sewing processing on the artificial leather or genuine leather. The armrest surface skin member 3c is constituted by joining and fixing each of divided surface skin members 3d and 3e of a top surface 3d and a side surface 3e in order to heighten an accentuation effect in appearance. And a shape-retaining sheet 8 such as a shirting sheet or a paper board is applied to a reverse side of a sewing portion by basting the top surface 3d and side surface 3e so as to perform the sewing processing along double stitch lines 7. For instance, Japanese Utility Model Kokai Publication No. 4-123199 indicates a conventional example of the sewing processing of a surface material of the armrest.

Thus, in the case of an armrest such as the armrest 3A of the high-grade specification which uses the artificial leather or genuine leather as the armrest surface skin member 3c and is provided with the stitch lines 7 of a single stitch specification and a double stitch specification, the stitch lines 7 are apt to meander due to tension on attachment when bending and fixing the armrest surface skin member 3c on the armrest core member 3a. This meandering phenomenon occurs even in the case where line length is short. However, this phenomenon is particularly conspicuous in the case where the line length is long. Therefore, there is a problem pointed out that, in the case where the stitch lines 7 are set long along a ridge line as with the armrest 3A for instance, appearance and performance of the armrest 3A are remarkably lowered.

The present invention has been made in view of these circumstances, and relates to a method for attaching a surface skin member with a stitch line. And an object thereof is to provide the method for attaching a surface skin member with a stitch line, which causes no problem to the stitch line such as meandering, looks attractive and is securely attachable by simple mounting work so as to allow great contribution to improvement in workability.

SUMMARY OF THE INVENTION

To solve the problem, the present invention provides a method for attaching a surface skin member with a stitch line on a surface of a base core member, comprising the steps of attaching and fixing the surface skin member (33) with a rod (36) on the surface of the base core member (31) having a groove (311), wherein the groove (311) is provided along the stitch line (A) on the surface of the base core member (31), the rod (36) is temporarily joined on a reverse surface of the surface skin member (33) and is accommodated inside the groove (311); and drawing out the rod (36) from the groove (311), thereby positioning the stitch line (A) along the groove (311) of the base core member (31).

Here, a resin molding is desirable as the base core member. Usable resin materials are a polyethylene resin, a polypropylene resin, a polystyrene resin, a polyethylene terephthalate resin, a polyvinyl alcohol resin, a vinyl chloride resin, a polyamide resin, a polyacetal resin, a polycarbonate resin, an ionomer resin, acrylonitrile/butadiene/styrene (ABS) resins and the like. They are formed in a required shape by an injection molding process or a mold press forming process. The surface skin member with a stitch line may use artificial leather or genuine leather, and the stitch line may be either a single stitch or a double stitch. The stitch may be formed on one margin or both margins of a join line for joining divided sheets of the artificial leather or genuine leather. Moreover, the stitch line such as the single stitch or double stitch only for a design purpose may be formed on a single artificial leather or genuine leather sheet.

The base core member is formed in the required shape by the injection molding process or the mold press forming process of a synthetic resin material. The groove for accommodating the rod can be easily formed when forming the base core member. As for the rod, an iron rod, a wire or the like may be used other than a plastic pipe ($\phi$1 to 3) of a polypropylene resin, an acrylic resin or the like. It is also possible to directly attach and fix the surface skin member composed of the artificial leather or genuine leather on the surface of the base core member. To provide cushioning property, however, it is desirable to place a pad layer such as urethane foam between the base core member and the surface skin member. The pad layer may be either attached and fixed on the surface of the base core member in advance or laminated on the reverse side of the surface skin member in advance. The rod can be easily joined temporarily by putting the rod between the surface skin member and a shape-retaining sheet and sewing it when sewing the shape-retaining sheet such as a shirting sheet or a paper board on the reverse side of the surface skin member.

According to the configuration, the rod is temporarily joined along the stitch line on the reverse side of the surface skin member. And if the surface skin member is applied to the surface of the base core member so as to accommodate the rod inside the groove of the base core member, it is possible to accurately position the surface skin member on an attached surface of the base core member without causing the stitch line to meander. Therefore, it is possible to reduce time for attachment working of the surface skin member and beautifully produce the stitch line. It is also possible to draw out the rod after attaching the surface skin member with the stitch line on the surface of the base core member and thereby reuse the rod for a new surface skin member of a next process. Thus, it is possible to contribute to resource saving by repeatedly using the rod.

According to another embodiment of the present invention, openings are formed at a prescribed pitch distance in the groove of the base core member; and a click for connecting and holding the rod is provided to an opening rim of the opening so that the surface skin member is drawn into the base core member side under proper tension when positioning the surface skin member.

Here, to connect and hold the rod with a locking click provided on the opening of the base core member, the rod should be rendered naked by slitting up the shape-retaining sheet. According to this embodiment, therefore, it is possible to connect and hold the rod with the click when attaching the surface skin member with the stitch line on the surface of the base core member so as to provide proper tension to the surface skin member and accurately locate the stitch line. Furthermore, when the base core member is stressed, the base core member breaks with the groove as a base point. As the opening renders it more easily breakable, impact occurred by side collision may be absorbed when particularly used for the armrest.

Furthermore, according to a preferred embodiment of the present invention, the openings are formed at a prescribed pitch distance in the groove of the base core member; and clips mounted on the rod are connected and held on the openings so that the surface skin member is drawn into the base core member side under proper tension when positioning the surface skin member.

Here, the openings are provided in the groove of the base core member, and the clips are mounted on the rod correspondingly to the openings. A leg piece of the clip should be exposed from a slit provided to the shape-retaining sheet so as to connect and hold the leg piece to the opening of the base core member. According to this embodiment, it is possible to provide the tension for drawing the surface skin member into the base core member side by means of the clips so that the stitch line can be more accurately made.

As described above, according to the method for attaching a surface skin member with a stitch line of the present invention, the rod is temporarily joined along the stitch line on the reverse side of the surface skin member, and the groove is formed on the surface side of the base core member. And when attaching the surface skin member on the surface of the base core member, the rod is accommodated in the groove of the base core member so that the surface skin member can be accurately positioned. And when the surface skin member and the surface of the base core member are attached and fixed, the stitch line can be accurately positioned by drawing out the rod. Therefore, the method has the effects that the stitch line of a relatively long dimension such as a ridge line of the armrest can be smartly formed without meandering so that appearance and design quality can be improved and attaching work can be performed in a short time, resulting in improved productivity.

As with the other embodiment of the present invention, the openings are provided at a prescribed pitch distance in the groove of the base core member so as to connect and fix the rod by forming the clicks in the openings or connect and fix the rod on the openings via the clips. Thus, it is possible to provide the surface skin member with tension for drawing and make the stitch line more smartly. And in the case where this is applied to a component, such as armrest, requiring the side collision impact absorbing performance, the openings become the base points of breaks of the base core member so that it is possible, as the effects thereof, to further facilitate the breaks and improve the side collision impact absorbing performance.

DETAILED DESCRIPTION OF THE PREFERRED EMBODIMENTS

Hereunder, a preferred embodiment of a method for attaching a surface skin member with a stitch line according to the present invention will be described with reference to the attached drawings. The scope of the present invention is as described in claims, and the contents of the embodiment described below merely show an example of the present invention.

Embodiments

Figure 1:
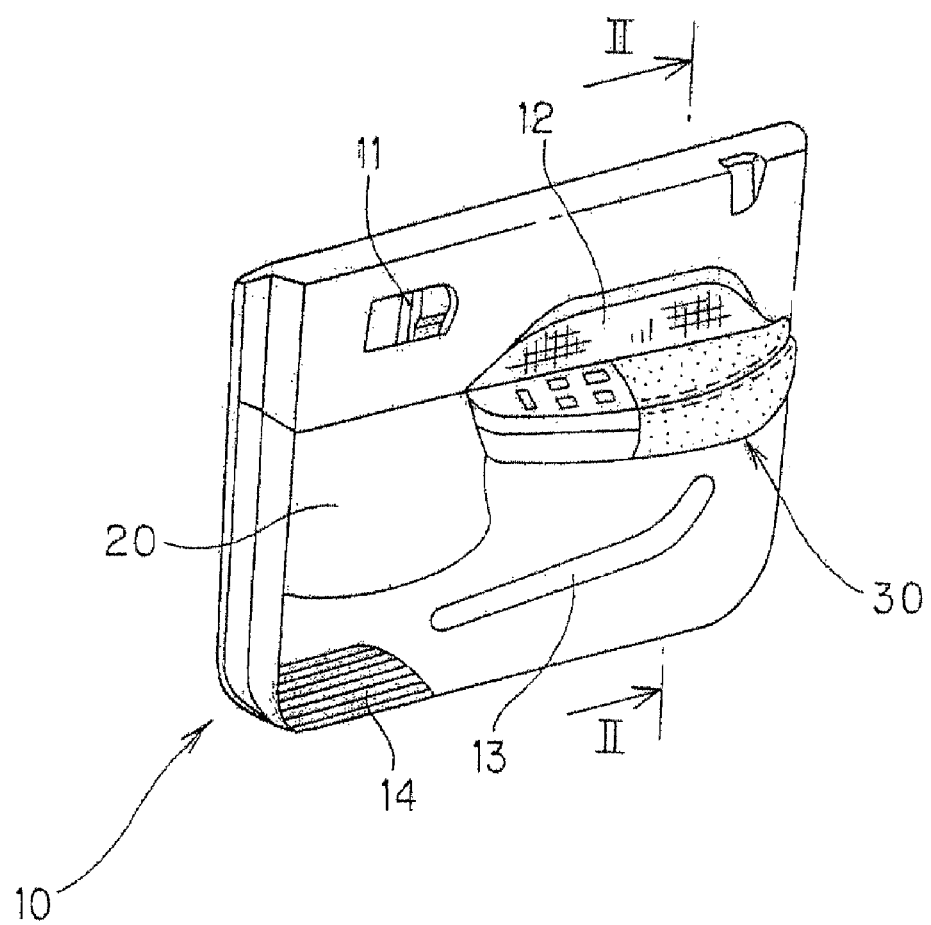
FIG. 1 is a perspective view showing an automotive door trim provided with an armrest made by using a method for attaching a surface skin member according to the present invention.
Figure 2:
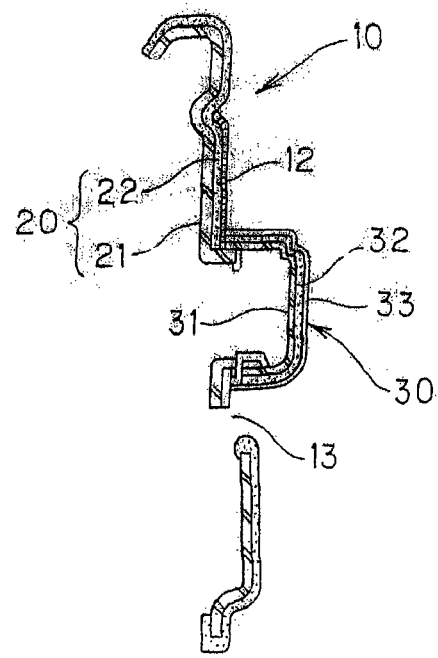
FIG. 2 is a II to II line sectional view in FIG. 1.
Figure 3:
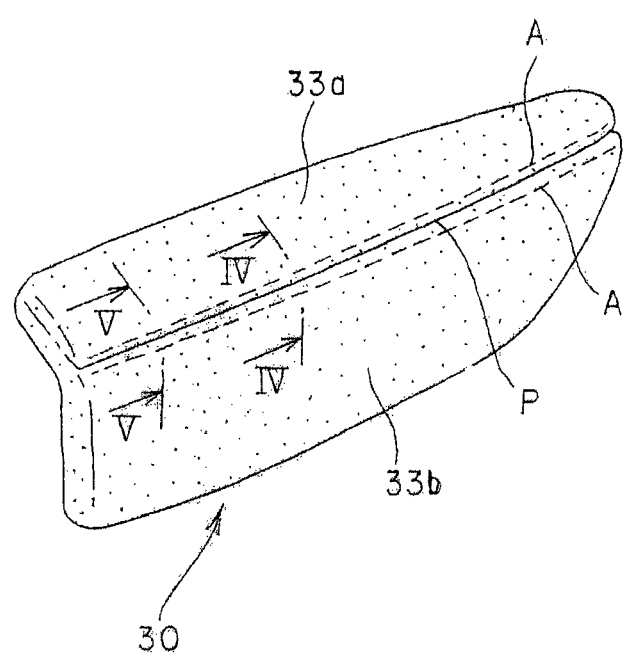
FIG. 3 is an appearance view showing the armrest provided to the door trim shown in FIG. 1.
Figure 4:
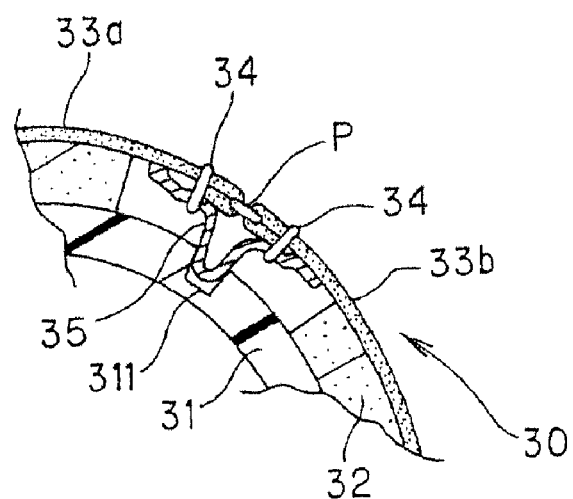
FIG. 4 is a IV to IV line sectional view in FIG. 3.
Figure 5:
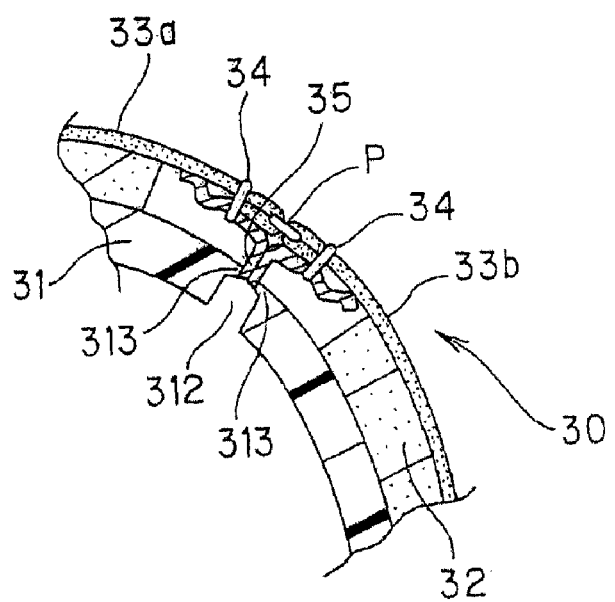
FIG. 5 is a V to V line sectional view in FIG. 3.
Figure 8:
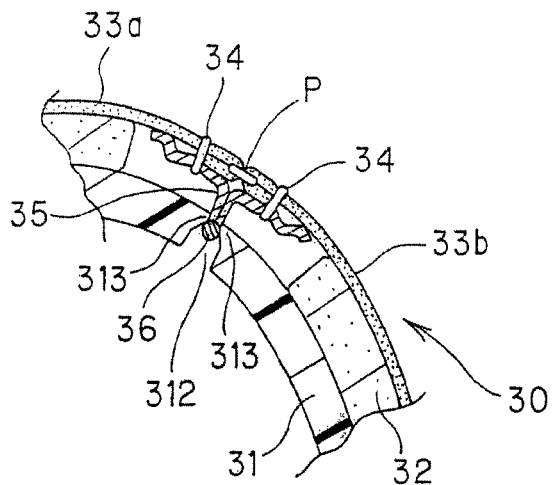
FIG. 8 is a sectional view showing a click fixing state of the rod according to the method for attaching a surface skin member according to the present invention.
Figure 9:
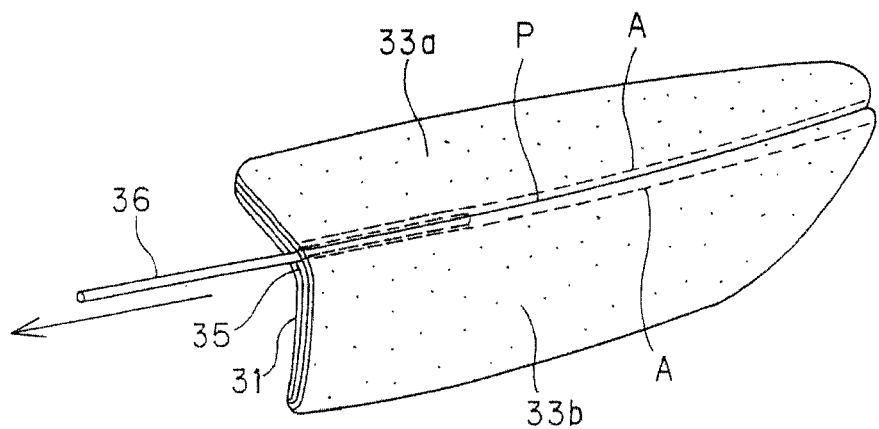
FIG. 9 is an explanatory view showing a drawing process of the rod according to the method for attaching a surface skin member according to the present invention.
Figure 10:
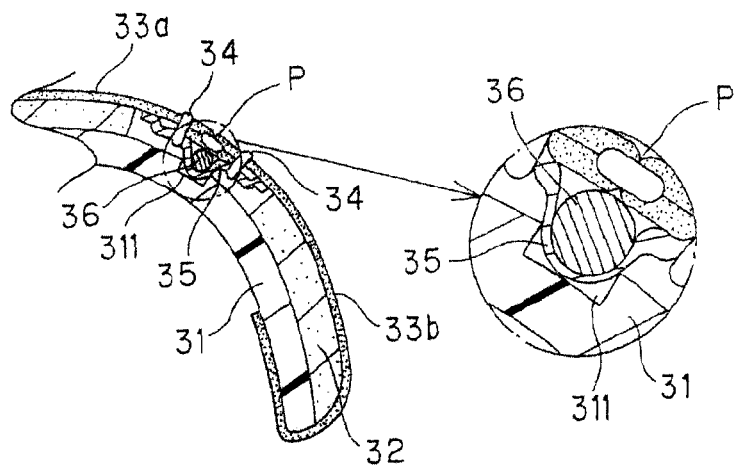
FIG. 10 is an explanatory view showing a variation of the method for attaching a surface skin member according to the present invention.
Figure 11:
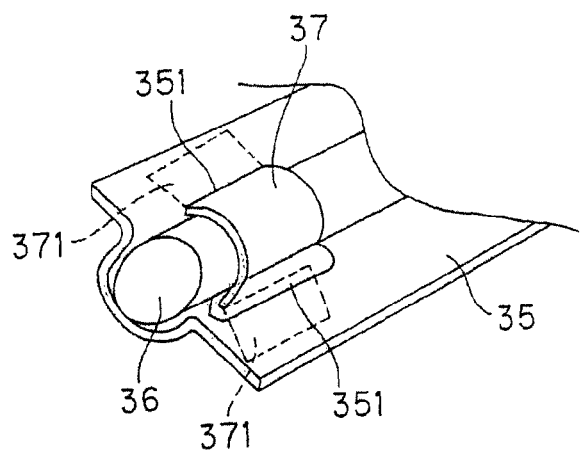
FIG. 11 is an explanatory view showing a state of mounting a clip on the rod of the method for attaching a surface skin member according to the present invention.
Figure 12:
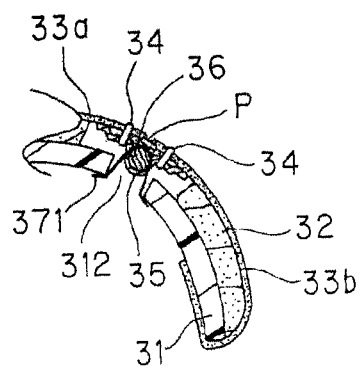
FIG. 12 is an explanatory view showing a state of attaching the surface skin member on the base core member by using the rod shown in FIG. 11.
Figure 13:
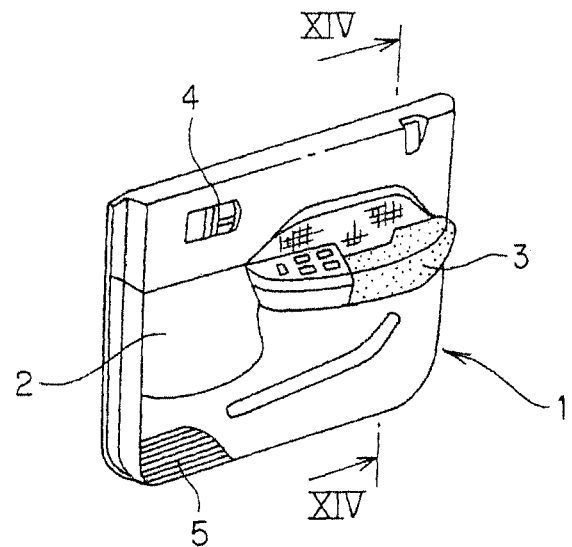
FIG. 13 is an appearance view showing the door trim provided with a conventional armrest.
Figure 14:
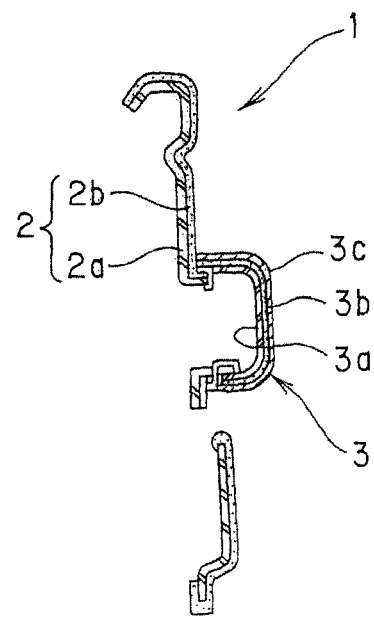
FIG. 14 is a XIV to XIV line sectional view in FIG. 13.
Figure 15:
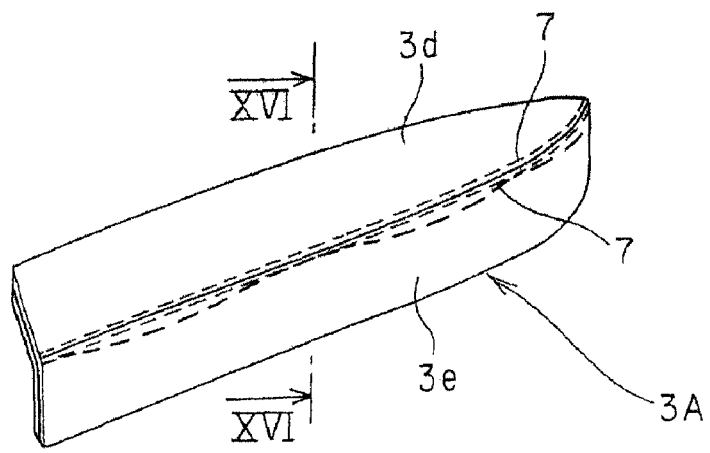
FIG. 15 is an appearance view showing the conventional armrest.
Figure 16:
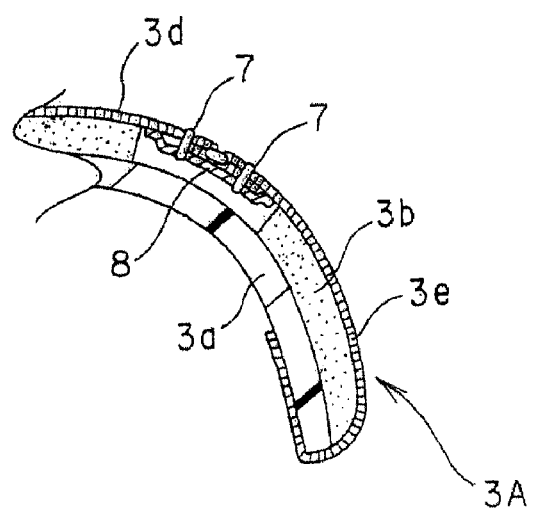
FIG. 16 is a XVI to XVI line sectional view in FIG. 15.

FIGS. 1 to 12 show an embodiment of the present invention. FIG. 1 is a perspective view showing a door trim provided with an armrest made by applying a method for attaching a surface skin member according to the present invention. FIG. 2 is a sectional view showing a configuration of the door trim. FIG. 3 is an appearance view showing the armrest made by applying the method for attaching a surface skin member according to the present invention. FIGS. 4 and 5 are sectional views showing the configuration of the armrest respectively. FIGS. 6 to 9 are explanatory views showing a process of making the armrest respectively. FIGS. 10 to 12 are explanatory views showing a variation of the method for attaching a surface skin member according to the present invention respectively.

In FIGS. 1 and 2, a door trim 10 is approximately composed of a door trim body 20 and an armrest 30 to be mounted approximately at the center on the surface of the door trim body 20. For more details, an inside handle escutcheon 11 is mounted above the armrest 30, and a decoration sheet 12 of a cloth or the like is mounted at a middle joint portion. A pocket opening 13 is provided below the armrest 30, and a speaker grille 14 is provided integrally with or separately from the door trim body 20 on a front side thereof.

For more details, the door trim body 20 is assembled by attaching a surface skin member 22 for implementing good surface texture and touch on the surface of a resin core member 21 which has mounting rigidity for the door panel not shown and a retaining property of the shape formed in the required shape. The resin core member 21 is made by forming a general-purpose synthetic resin in a desired shape by an injection molding process, a mold press forming process or the like, where the synthetic resin may be a polyethylene resin, a polypropylene resin, a polystyrene resin, a polyethylene terephthalate resin, a polyvinyl alcohol resin, a vinyl chloride resin, a polyamide resin, a polyacetal resin, a polycarbonate resin, an ionomer resin, acrylonitrile/butadiene/styrene (ABS) resins or the like. The surface skin member 22 is integrally attached when forming the resin core member 21. As for the surface skin member 22, a synthetic-resin sheet, a cloth sheet such as a woven cloth or an unwoven cloth or the like is applicable. It is also possible to line the reverse sides of the synthetic-resin sheet and cloth sheet with a cushion layer.

Next, a description will be given based on FIGS. 3 to 5 as to the configuration of the armrest 30 to be mounted approximately at the center on the surface of the door trim body 20. The armrest 30 is assembled by laminating a pad 32 having cushioning property on the surface of a base core member 31 having a shape retaining property and formed in the required shape and covering the surfaces thereof with a surface skin member 33. For more details, the base core member 31 is made by forming a synthetic resin in the required shape by the injection molding process, the mold press forming process or the like, where usable resin materials are general-purpose thermoplastic resins, such as the polyethylene resin, polypropylene resin, polystyrene resin, polyethylene terephthalate resin, polyvinyl alcohol resin, vinyl chloride resin, polyamide resin, polyacetal resin, polycarbonate resin, ionomer resin and acrylonitrile/butadiene/styrene (ABS) resins.

A soft resin molding, such as polyurethane foam or polyolefin foam, is used for the pad 32, and is placed between the base core member 31 and the surface skin member 33 by using slab-like foam. The pad 32 may be either attached and fixed on the base core member 31 side in advance or laminated on the reverse side of the surface skin member 33 in advance. On the other hand, a leather sheet material of artificial leather, genuine leather or the like is used for the surface skin member 33 because of being the armrest 30 of a high-grade specification. Especially, divided bodies of a top surface 33a and a side surface 33b are joined by sewing, a parting line P is formed between them, and a stitch line A is set as a double stitch specification along both margins of the parting line P.

The present invention thus uses the leather sheet material as the surface skin member 33, and is characterized in that, on attaching and fixing the surface skin member 33 with the stitch line A of the double stitch specification on the base core member 31, the stitch line A can be formed as a sharp line without meandering not to mention the parting line P as shown in FIG. 3, its appearance and performance are good, and attaching work of the surface skin member 33 can be easily and promptly performed. As shown in FIGS. 4 and 5, the top surface 33a and a side surface 33b constituting the surface skin member 33 are temporarily joined by basting along the parting line P, and a shape-retaining sheet 35 such as a shirting sheet or a paper board is sewn on the reverse side of the surface skin member 33 with a sewing thread 34 so as to form the stitch line A to the double stitch specification. The base core member 31 has a groove 311 corresponding to the parting line P of the surface skin member 33 concavely provided on the surface of the base core member 31. Openings 312 are formed at a prescribed pitch distance along a longitudinal direction of the groove 311, and clicks 313 facing each other are formed on the opening rim of the opening 312 as shown in FIG. 5. To be more specific, the groove 311 of the base core member 31 acts as a reference line so that the parting line P and stitch line A are beautifully made without meandering.

Figure 6:
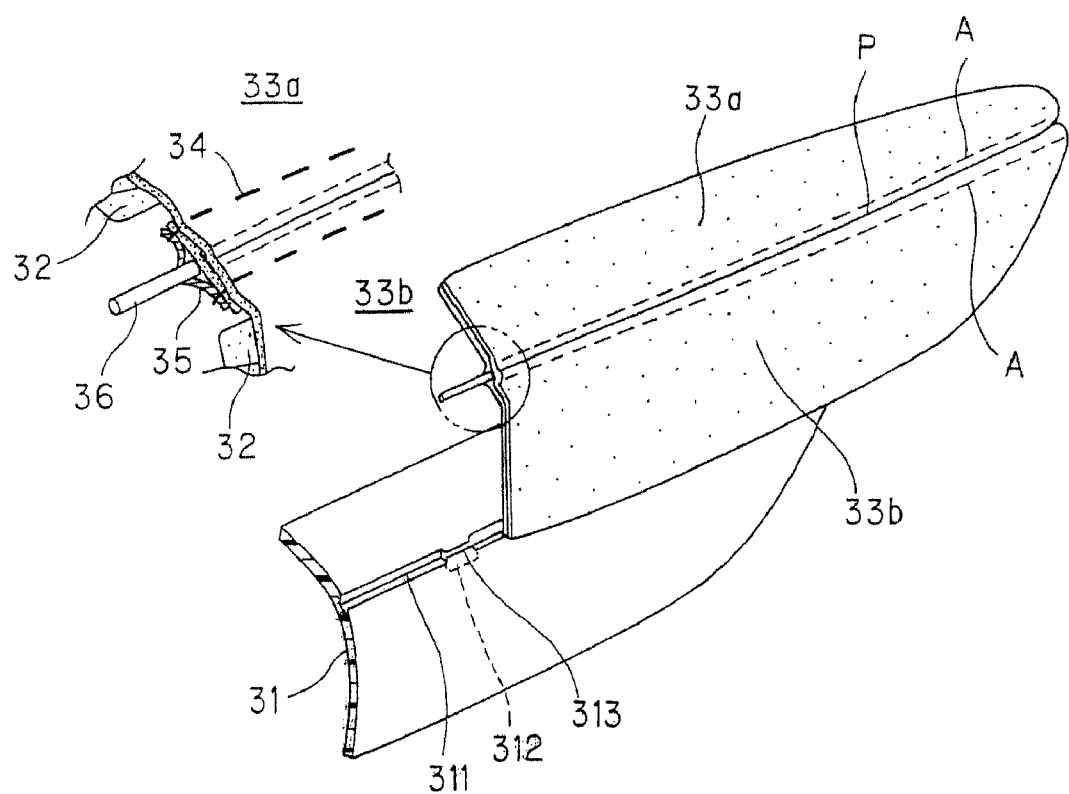
FIG. 6 is an explanatory view showing an overview of the method for attaching a surface skin member of the armrest according to the present invention.

Next, the method for attaching the surface skin member 33 according to the present invention will be described based on FIGS. 6 to 9. First, as shown in FIG. 6, the top surface 33a and side surface 33b are joined by basting along the parting line P to form a desired surface skin member 33, and then the shape-retaining sheet 35 is sewn with the sewing thread 34 so as to form the stitch line A. In this case, the sewing is performed in the state that a rod 36 is accommodated between the surface skin member 33 and the shape-retaining sheet 35. According to this embodiment, a pipe ($\phi$1 to 3) of the polypropylene resin is used as the rod 36. However, an iron rod, a wire or the like may also be used as the rod 36 in addition to a pipe of an acrylic resin. After basting the top surface 33a and side surface 33b along the parting line P, the rod 36 is put between the surface skin member 33 and the shape-retaining sheet 35, and the stitch line A is formed by stitch working.

Figure 7:
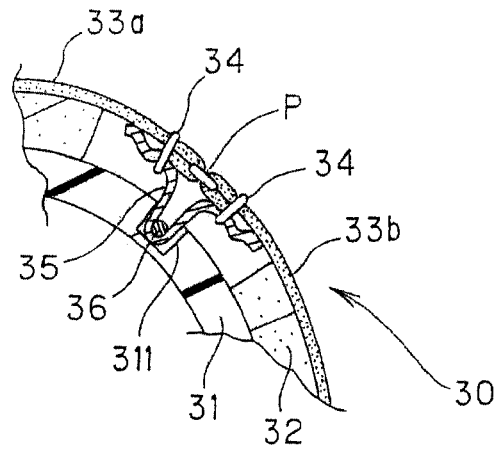
FIG. 7 is a sectional view showing a state in which a rod is accommodated in a groove of a base core member according to the method for attaching a surface skin member according to the present invention.

Furthermore, the pad 32 composed of slab-like polyurethane foam and attached and fixed on the reverse side of the surface skin member 33 is attached and fixed on the surface of the base core member 31. In this case, when positioning the surface skin member 33, the rod 36 accommodated along the parting line P in the reverse side of the surface skin member 33 is set inside the groove 311 of the base core member 31 so that the surface skin member 33 can be positioned in a proper position on the surface of the base core member 31. In this case, the openings 312 are formed at a prescribed pitch distance in the groove 311, and the rod 36 is connected and fixed by the clicks 313 formed on opening rims of the openings 312 so that the surface skin member 33 can be positioned on the base core member 31 under proper tension. Thus, the surface skin member 33 can be easily, promptly and smartly attached to the base core member 31. FIG. 7 shows a state in which the rod 36 is accommodated in the groove 311 of the base core member 31. FIG. 8 shows the state in which the rod 36 is connected and held by the clicks 313 formed on the opening 312 in the groove 311 of the base core member 31. Thus, the rod 36 is accommodated in the groove 311 of the base core member 31, and so the parting line P and the stitch line A of the surface skin member 33 are linearly and beautifully regulated by the rod 36 without meandering. As shown in FIG. 9, making of the armrest 30 having a cross-section shape shown in FIGS. 4 and 5 is completed thereafter by drawing out the rod 36 from a terminal side of the surface skin member 33.

Therefore, the rod 36 can be reused for a next process upon completion of the making of the armrest 30 and drawn it out. For this reason, repeated use is possible, which is advantageous in terms of cost. In particular, if the openings 312 are provided at a prescribed pitch distance in the groove 311 of the base core member 31 of the armrest 30, there is an incidental effect that the base core member 31 easily breaks with the openings 312 of the groove 311 as base points when an impact, such as a impact occurred by side collision, is applied to the armrest so that impact absorption performance on the side impact can be improved.

Next, as shown in FIG. 10, it is possible to adopt a simple configuration in which the rod 36 along the parting line P of the surface skin member 33 is temporarily joined in the groove 311 of the base core member 31 so as to accommodate the rod 36 inside the groove 311. In this case, cost reduction due to the simplified configuration of the base core member 31 can be expected by eliminating the openings 312 and clicks 313.

As shown in FIGS. 11 and 12, it is further possible, instead of the configuration for holding the rod 36 by a click connecting and holding method, to use a method of using a separate clip 37 and mounting the clip 37 at a predetermined point of the rod 36, projecting leg pieces 371 of the clip 37 to the base core member 31 side from a slit 351 of the shape-retaining sheet 35, connecting and holding the leg pieces 371 on the right and left sides on the rim of the opening 312 provided in the groove 311 of the base core member 31 and thereby exerting a drawing force on the surface skin member 33 in order to attach the surface skin member 33. The variation described above is the same as the above-mentioned embodiment as to the action of allowing the parting line P and the stitch line A to be smartly formed by properly positioning the surface skin member 33 on the base core member 31 and drawing and eliminating the rod 36.

The embodiment described above is applied to the method for attaching the surface skin member 33 according to the invention to the armrest 30 to be mounted approximately at the center on the surface of the door trim body 20. However, the method is also applicable to interior components such as an ornament lid of a center console and lids of various boxes, that is, to the interior components in general of a type of attaching the surface skin member 33 with the stitch line A to the base core member 31.

What is claimed is:

1. A method for attaching a surface skin member (33) with a stitch line (A) on a surface of a base core member (31), comprising the steps of:

attaching and fixing the surface skin member (33) with a rod (36) on the surface of the base core member (31) having a groove (311), wherein the groove (311) is provided along the stitch line (A) on the surface of the base core member (31), the rod (36) is temporarily joined on a reverse surface of the surface skin member (33) and is accommodated inside the groove (311); and drawing out the rod (36) from the groove (311), thereby positioning the stitch line (A) along the groove (311) of the base core member (31), wherein openings (312) are formed at a prescribed pitch distance in the groove (311) of the base core member (31), and a click (313) for connecting and holding said rod (36) is provided to a rim of said opening (312) so that said surface skin member (33) is drawn into said base core member (31) side under proper tension when positioning said surface skin member (33).

2. A method for attaching a surface skin member (33) with a stitch line (A) on a surface of a base core member (31), comprising the steps of:

attaching and fixing the surface skin member (33) with a rod (36) on the surface of the base core member (31) having a groove (311), wherein the groove (311) is provided along the stitch line (A) on the surface of the base core member (31), the rod (36) is temporarily joined on a reverse surface of the surface skin member (33) and is accommodated inside the groove (311); and drawing out the rod (36) from the groove (311), thereby positioning the stitch line (A) along the groove (311) of the base core member (31), wherein openings (312) are formed at a prescribed pitch distance in the groove (311) of the base core member (31), and clips (37) mounted on the rod (36) are connected to the openings (312) so that the surface skin member (33) is drawn into the base core member (31) side under proper tension when positioning the surface skin member (33).

* * * * *